United States Patent
Maeda et al.

(10) Patent No.: US 10,356,887 B2
(45) Date of Patent: Jul. 16, 2019

(54) COMMUNICATIONS DEVICE

(71) Applicant: Panasonic Intellectual Property Management Co., Ltd., Osaka (JP)

(72) Inventors: Hikaru Maeda, Osaka (JP); Shinichiro Kurihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/193,538

(22) Filed: Nov. 16, 2018

(65) Prior Publication Data
US 2019/0166677 A1    May 30, 2019

(30) Foreign Application Priority Data

Nov. 29, 2017 (JP) ................................. 2017-229710

(51) Int. Cl.
*H05B 37/02* (2006.01)
*H04W 4/00* (2018.01)
(Continued)

(52) U.S. Cl.
CPC ......... *H05B 37/0272* (2013.01); *G08C 17/02* (2013.01); *H04L 12/282* (2013.01);
(Continued)

(58) Field of Classification Search
CPC ............ H05B 37/0272; H05B 33/0845; H05B 37/0245; H05B 33/0863; H05B 37/0218; H05B 33/0842; H05B 37/02; H05B 37/0254; H05B 33/0857; H04W 4/80; H04W 84/18; H04W 84/12; H04W 8/26; H04W 92/02; H04W 28/0231; H04W 88/16; H04W 4/33; H04W 4/38; H04L 67/125; H04L 2012/2841; H04L 2209/80;
(Continued)

(56) References Cited

U.S. PATENT DOCUMENTS 8,510,025 B2 * 8/2013 Chan ..................... H04W 24/08
701/117
9,154,982 B2 * 10/2015 Chan ..................... H04W 24/08
(Continued)

FOREIGN PATENT DOCUMENTS

JP    2017-502475 A    1/2017

*Primary Examiner* — Vibol Tan
(74) *Attorney, Agent, or Firm* — Renner, Otto, Boisselle & Sklar, LLP

(57) ABSTRACT

A communications device connects one or more first lighting devices included in a first local network with one or more second lighting devices included in a second local network different from the first local network. The communications device includes a single semiconductor integrated circuit including: a first processing unit that wirelessly communicates with the one or more first lighting devices via a first communications protocol; a second processing unit that wirelessly communicates with the one or more second lighting devices via a second communications protocol different from the first communications protocol; and a control unit that switches between causing the first processing unit to wirelessly communicate with the one or more first lighting devices and causing the second processing unit to wirelessly communicate with the one or more second lighting devices.

9 Claims, 5 Drawing Sheets

(51) Int. Cl.
    *H04L 12/28*     (2006.01)
    *H04L 29/06*     (2006.01)
    *H04L 12/66*     (2006.01)
    *G08C 17/02*     (2006.01)
    *H04L 29/08*     (2006.01)
    *H05B 33/08*     (2006.01)
    *H04W 4/80*     (2018.01)

(52) U.S. Cl.
    CPC .............. *H04L 12/66* (2013.01); *H04L 67/10* (2013.01); *H04L 67/125* (2013.01); *H04L 69/18* (2013.01); *H04W 4/80* (2018.02); *H05B 33/0857* (2013.01); *H05B 37/02* (2013.01); *G08C 2201/70* (2013.01)

(58) Field of Classification Search
    CPC ....... H04L 12/66; H04L 69/18; H04B 10/116; H04B 10/114; H04B 10/1149; H04B 7/04; Y02D 70/142; Y02D 70/144; Y02D 70/162; Y02D 70/22; Y02D 70/166; F21Y 2115/10; G08C 17/02; G08C 2201/70
    See application file for complete search history.

(56) References Cited

U.S. PATENT DOCUMENTS

| | | | |
|---|---|---|---|
| 9,913,351 B2* | 3/2018 | Unoson | H05B 37/0272 |
| 2016/0337143 A1* | 11/2016 | Maher | H04L 12/282 |
| 2016/0338179 A1 | 11/2016 | Aliakseyeu | |
| 2017/0208623 A1* | 7/2017 | Bate | H04W 80/00 |
| 2018/0213349 A1* | 7/2018 | Panje | H04L 67/12 |
| 2018/0235061 A1* | 8/2018 | Kurihara | H04W 12/02 |

\* cited by examiner

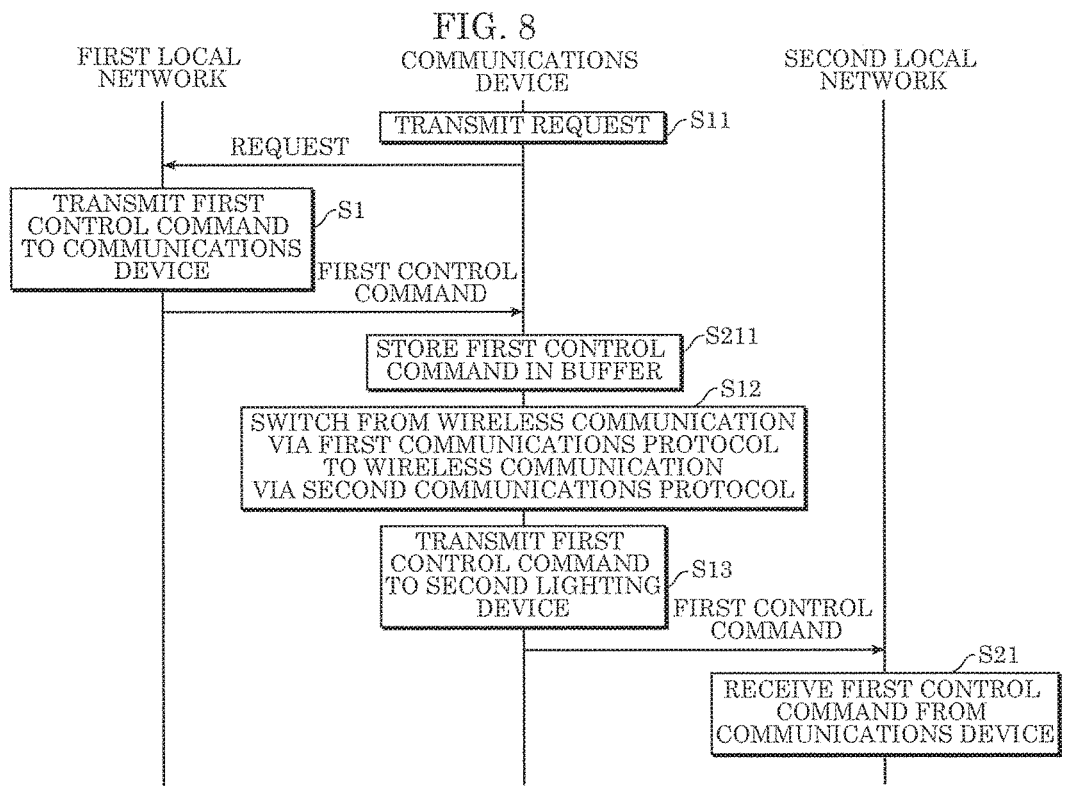
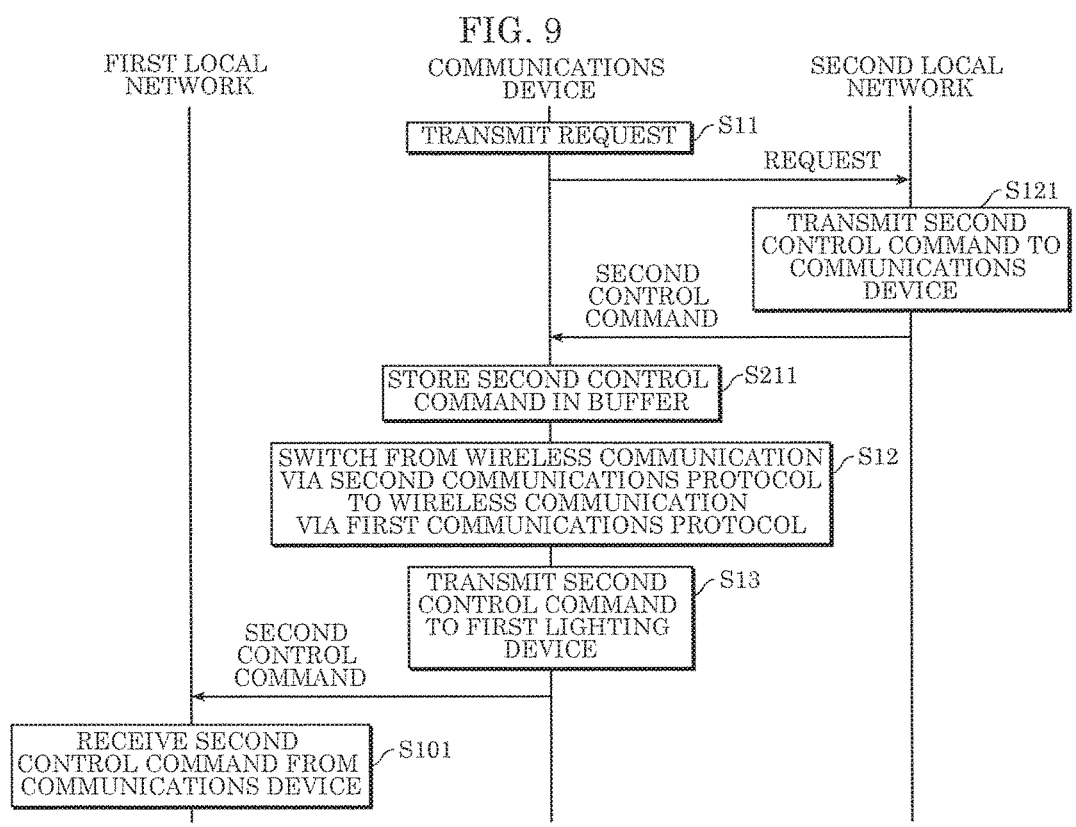

COMMUNICATIONS DEVICE

CROSS REFERENCE TO RELATED APPLICATION

This application claims the benefit of priority of Japanese Patent Application Number 2017-229710 filed on Nov. 29, 2017, the entire content of which is hereby incorporated by reference.

BACKGROUND

1. Technical Field

The present disclosure relates to a communications device.

2. Description of the Related Art

Japanese Unexamined Patent Application Publication (Translation of PCT Application) No. 2017-502475 discloses a lighting system including a local lighting system and a remote lighting system. The local lighting system includes a single light source group, and the remote lighting system includes a different light source group, and uses a wireless communication method different from the method used by the local lighting system. This lighting system communicably connects the local and remote lighting systems via a wide area computing network, including the internet.

SUMMARY

With such a lighting system, communication between local and remote lighting systems can be performed exclusively over the internet; the local and remote lighting systems cannot communicate via local communications. Accordingly, when the local and remote lighting systems use mutually different communications protocols, the local and remote lighting systems are forced to communicate via the internet. This delays communication between the local and remote lighting systems.

In view of this, the present disclosure has an object to provide a communications device capable of increasing communication speeds between two different local networks.

In order to achieve the above object, a communications device according to one aspect of the present disclosure connects one or more first devices included in a first local network with one or more second devices included in a second local network different from the first local network, and includes a single semiconductor integrated circuit including: a first processor configured to wirelessly communicate with the one or more first devices via a first communications protocol; a second processor configured to wirelessly communicate with the one or more second devices via a second communications protocol different from the first communications protocol; and a controller configured to switch between causing the first processor to wirelessly communicate with the one or more first devices and causing the second processor to wirelessly communicate with the one or more second devices. The controller is further configured to: when the first processor receives first information from the one or more first devices, cause the second processor to transmit the first information to the one or more second devices via the second communications protocol; and when the second processor receives second information from the one or more second devices, cause the first processor to transmit the second information to the one or more first devices via the first communications protocol.

According to the present disclosure, it is possible to increase communication speeds between two different local networks.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a sequence chart illustrating operations performed by a lighting system according to Embodiment 2; and FIG. 9 is a sequence chart illustrating operations performed by a lighting system according to Embodiment 2.

DETAILED DESCRIPTION OF THE EMBODIMENTS

Figure 1:
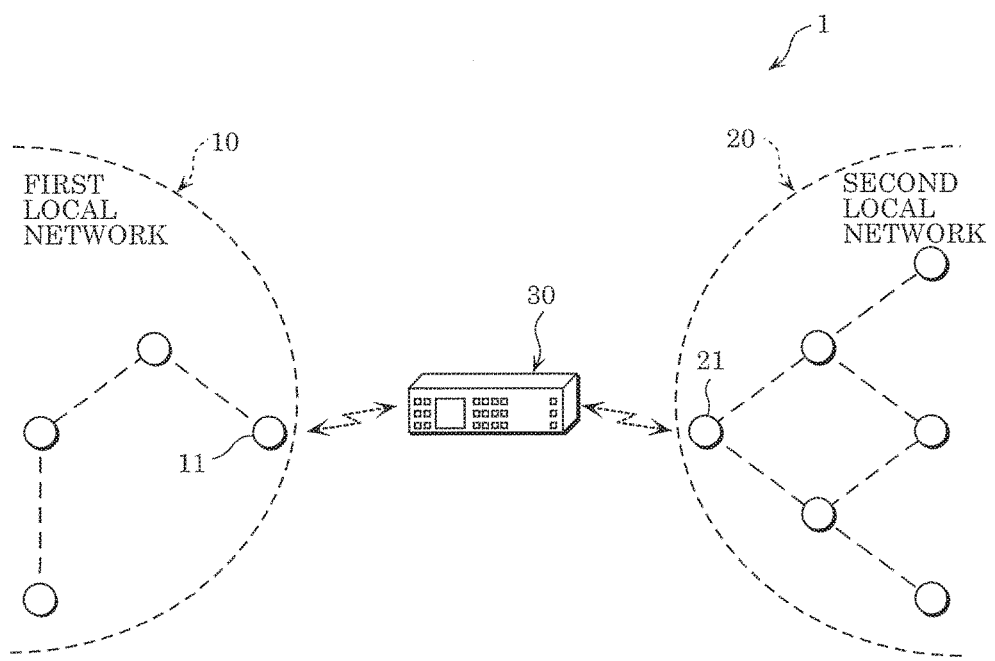
FIG. 1 schematically illustrates a lighting system according to Embodiment 1.

The following describes embodiments with reference to the drawings. The embodiments described below each show a preferred, specific example of the present disclosure. The numerical values, shapes, materials, elements, the arrangement and connection of the elements, steps, order of the steps, etc., indicated in the following embodiments are mere examples, and therefore do not intend to limit the present disclosure. Therefore, among elements in the following embodiments, those not recited in any of the broadest, independent claims are described as optional elements.

Note that the drawings are represented schematically and are not necessarily precise illustrations. Additionally, like reference signs indicate like elements in the drawings, and overlapping descriptions thereof are omitted or simplified.

Hereinafter, communications devices according to embodiments of the present disclosure will be described.

Embodiment 1

(Configuration)

Figure 2:
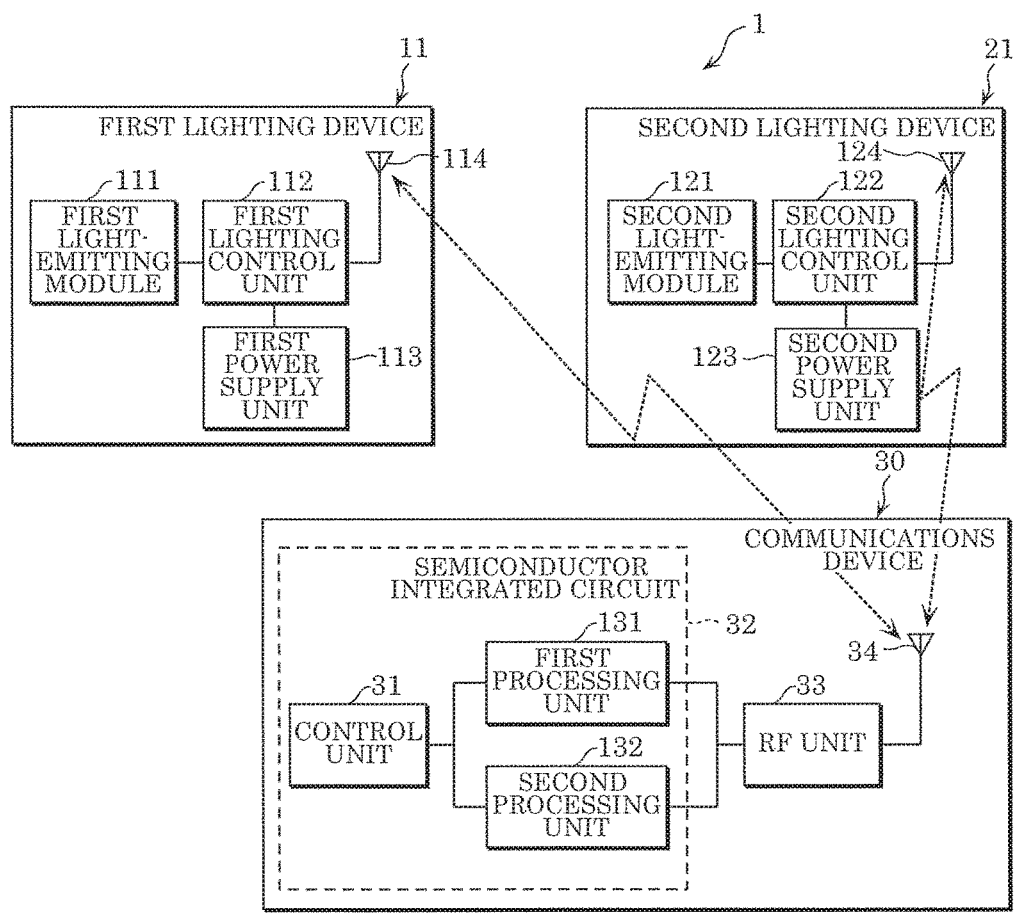
FIG. 2 is a block diagram of a lighting system according to Embodiment 1.

FIG. 1 schematically illustrates lighting system 1 according to Embodiment 1. FIG. 2 is a block diagram of lighting system 1 according to Embodiment 1.

As illustrated in FIG. 1, lighting system 1 includes, for example, a plurality of lighting devices and communications device 30, each including a wireless communications function. In lighting system 1, a local network of a plurality of lighting devices is formed by adjacent lighting devices wirelessly communicating with each other and forming wireless communication paths. The local network may be formed between lighting devices within a predetermined number of hops. Here, a local network refers to a network of wireless communication paths between lighting devices.

Lighting system 1 includes first local network 10, second local network 20, and communications device 30. When the communications protocol used in first local network 10 and the communications protocol used in second local network 20 are different, sharing of a control command for the lighting devices between first local network 10 and second local network 20 is enabled in lighting system 1. Here, the control command indicates a lighting scene in which one or more combinations of dimming control and color control parameters, such as for controlling the hue or color temperature of light, are reproduced by lighting devices.

Note that in this embodiment, first local network 10 and second local network 20 are exemplified as being connected by wirelessly communicating via communications device 30, but a first mesh network may be used as an example of first local network 10, and a different, second mesh network may be used as an example of second local network 20.

(First Local Network)

First local network 10 is a local network that includes one or more first lighting devices 11, and is different from second local network 20. A portion of the one or more first lighting devices 11 are connected to communications device 30 such that wireless connection is possible. Each first lighting device 11 is capable of communicating with a communications terminal capable of operating each first lighting device 11. In first local network 10, first lighting devices 11 wirelessly communicate with each other via a wireless communication method according to the first communications protocol. First lighting device 11 is one example of the first device. Note that the first device is not limited to a lighting device, and may be some other device such as an air conditioner, printer, or smartphone, etc.

Each first lighting device 11 is, for example, a ceiling light or downlight, and is installed in a part of a building, such as a ceiling or a wall. As illustrated in FIG. 2, each first lighting device 11 includes first light-emitting module 111, first communications unit 114, first lighting control unit 112, and first power supply unit 113.

The dimming and color of light emitted by first light-emitting module 111 is controlled by first lighting control unit 112. First light-emitting module 111 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material, and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

First communications unit 114 includes an antenna and a wireless module. First communications unit 114 in a given first lighting device 11 is disposed in a location at which wireless communication with communications device 30 is possible. First communications unit 114 receives a second control command indicating, for example, a lighting scene set in second local network 20, and transmits a first control command indicating, for example, a lighting scene set in first local network 10. The first control command is one example of the first information.

Moreover, first communications unit 114 in a given first lighting device 11 wirelessly communicates with first communications unit 114 included in a different first lighting device 11. This enables each first lighting device 11 to communicate with another proximally located first lighting device 11. The wireless communication method is, for example, WiFi (registered trademark), Bluetooth (registered trademark), or ZigBee (registered trademark) stipulated in IEEE 802.15.1. In this embodiment, wireless communication is performed using the 2.4 GHz frequency band.

In this embodiment, first local network 10 is a ZigBee network that employs mesh routing. ZigBee employs mesh routing to establish an optimal route within the network.

First lighting control unit 112 is electrically connected to first light-emitting module 111, first communications unit 114, and first power supply unit 113. For example, first lighting control unit 112 can control the dimming and color of light emitted by first light-emitting module 111 by controlling the dimming circuit and color adjustment circuit in first light-emitting module 111.

First lighting control unit 112 can be implemented using, for example, a microcomputer including a central processing unit (CPU). First lighting control unit 112 can perform predetermined lighting control operations by, for example, executing an appropriate program stored in a memory unit. The memory unit can be implemented using non-volatile semiconductor memory such as flash memory or electrically erasable and programmable read only memory (EEPROM).

First power supply unit 113 converts alternating current power supplied from a utility power supply into direct current power of a predetermined level by, for example, rectifying, smoothing, and stepping down the alternating current power, and supplies the converted direct current power to first light-emitting module 111 via first lighting control unit 112.

(Second Local Network)

Second local network 20 is a local network that includes one or more second lighting devices 21. A portion of the one or more second lighting devices 21 are wirelessly communicably connected to communications device 30. Each second lighting device 21 is capable of communicating with a communications terminal capable of operating each second lighting device 21. In second local network 20, second lighting devices 21 wirelessly communicate with each other via a wireless communication method according to a second communications protocol different from the first communications protocol. Second lighting device 21 is one example of the second device. Note that the second device is not limited to a lighting device, and may be some other device such as an air conditioner, printer, or smartphone, etc.

Each second lighting device 21 is, for example, a ceiling light or downlight, and is installed in a part of a building, such as a ceiling or a wall. Each second lighting device 21 includes second light-emitting module 121, second communications unit 124, second lighting control unit 122, and second power supply unit 123.

The dimming and color of light emitted by second light-emitting module 121 is controlled by second lighting control unit 122. Second light-emitting module 121 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material, and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

Second communications unit 124 includes an antenna and a wireless module. Second communications unit 124 in a given second lighting device 21 is disposed in a location at which wireless communication with communications device 30 is possible. Second communications unit 124 receives a first control command indicating, for example, a lighting scene set in first local network 10, and transmits a second control command indicating, for example, a lighting scene set in second local network 20. The second control command is one example of the second information.

Moreover, second communications unit 124 in a given second lighting device 21 wirelessly communicates with second communications unit 124 included in a different second lighting device 21. This enables each second lighting device 21 to communicate with another proximally located second lighting device 21.

The wireless communication method is, for example, WiFi (registered trademark) stipulated in IEEE 802.11, or Bluetooth (registered trademark) or ZigBee stipulated in IEEE 802.15.1. In this embodiment, wireless communication is performed using the 2.4 GHz frequency band.

In this embodiment, second local network 20 is a Bluetooth (registered trademark) mesh network that employs managed flooding, which is for optimizing data to be forwarded to all nodes connected to second local network 20. For example, when a device broadcasts a message (packet), a device that receives the broadcast relays the broadcast to surrounding devices so that the message reaches all devices capable of communication. However, if unregulated, the message will flood the network. Accordingly, control is implemented that, for example, prevents a message that has been transmitted from being retransmitted or limits the number of times the message can be relayed.

Second lighting control unit 122 is electrically connected to second light-emitting module 121, second communications unit 124, and second power supply unit 123. For example, second lighting control unit 122 can control the dimming and color of light emitted by second light-emitting module 121 by controlling the dimming circuit and color adjustment circuit in second light-emitting module 121.

Second lighting control unit 122 can be implemented using, for example, a microcomputer including a CPU. Second lighting control unit 122 can perform predetermined lighting control operations by, for example, executing an appropriate program stored in a memory unit.

Second power supply unit 123 converts alternating current power supplied from a utility power supply into direct current power of a predetermined level by, for example, rectifying, smoothing, and stepping down the alternating current power, and supplies the converted direct current power to second light-emitting module 121 via second lighting control unit 122.

(Communications Device)

Communications device 30 is a gateway device that wirelessly connects one or more first lighting devices 11 included in first local network 10 with one or more second lighting devices 21 included in second local network 20, which is different from first local network 10. Communications device 30 can reciprocally wirelessly communicate with first local network 10 that wirelessly communicates via the first communications protocol, and can reciprocally wirelessly communicate with second local network 20 that wirelessly communicates via the second communications protocol different from the first communications protocol. In other words, communications device 30 is capable of multiprotocol wireless communication. Note that communications device 30 may be a lighting device including such a gateway device.

Communications device 30 includes a single semiconductor integrated circuit 32, third communications unit 34, and radio frequency (RF) unit 33.

The single semiconductor integrated circuit 32 is a single IC chip. Semiconductor integrated circuit 32 is configured of, for example, a microprocessor, ROM, and RAM. Semiconductor integrated circuit 32 includes control unit 31 (one example of the controller), first processing unit 131 (one example of the first processor), and second processing unit 132 (one example of the second processor).

Control unit 31 is a host controller that controls processes performed by, for example, first processing unit 131 and second processing unit 132 included in communications device 30. Control unit 31 includes the top five layers of the open systems interconnection (OSI) reference model. First processing unit 131 and second processing unit 132 are included in the bottom physical layer of the OSI reference model.

First processing unit 131 is connected between control unit 31 and RF unit 33. First processing unit 131 wirelessly communicates with one or more first lighting devices 11 included in first local network 10 via the first communications protocol. First processing unit 131 uses a communications protocol that does not include an IP stack. Examples of communications protocols that do not include an IP stack include ZigBee and Bluetooth (registered trademark). An IP stack is a stack of IP layers capable of analyzing IP. In this embodiment, first processing unit 131 is a ZigBee chip for performing wireless communication via the first communications protocol, i.e., ZigBee.

First processing unit 131 transmits the second control command and receives the first control command to and from first lighting device 11 by wirelessly communicating with first lighting device 11 via RF unit 33 and third communications unit 34, using the first communications protocol.

Second processing unit 132 is connected in parallel with first processing unit 131 between control unit 31 and RF unit 33. Second processing unit 132 wirelessly communicates with one or more second lighting devices 21 included in second local network 20 via the second communications protocol. In other words, second processing unit 132 uses a communications protocol that is different from the communications protocol used by first processing unit 131. Second processing unit 132 uses a communications protocol that does not include an IP stack. In this embodiment, second processing unit 132 is a Bluetooth (registered trademark) chip for performing wireless communication via the second communications protocol, i.e., Bluetooth (registered trademark).

Second processing unit 132 transmits the first control command and receives the second control command to and from one or more second lighting devices 21 by communications device 30 wirelessly communicating with one or more second lighting devices 21 via RF unit 33 and third communications unit 34, using the second communications protocol.

Accordingly, control unit 31 switches between causing first processing unit 131 to wirelessly communicate with the one or more first lighting devices 11 and causing second processing unit 132 to wirelessly communicate with the one or more second lighting devices 21. When first processing unit 131 receives a first control command from the one or more first lighting devices 11, control unit 31 causes second processing unit 132 to transmit the first control command to the one or more second lighting devices 21 via the second communications protocol. When second processing unit 132 receives a second control command from the one or more second lighting devices 21, control unit 31 causes first processing unit 131 to transmit the second control command to the one or more first lighting devices 11 via the first communications protocol.

In this embodiment, when communication is performed between first lighting device 11 and communications device 30 via ZigBee, control unit 31 obtains the first control command obtained by first processing unit 131 from the one or more first lighting devices 11. Control unit 31 then outputs the first control command obtained via ZigBee by first processing unit 131 to second processing unit 132. Second processing unit 132 transmits the obtained first control command to one or more second lighting devices 21 via Bluetooth (registered trademark).

Moreover, control unit 31 performs wireless communication using first processing unit 131 and performs wireless communication using second processing unit 132 temporally mutually exclusively. More specifically, first processing unit 131 and second processing unit 132 intermittently receive control commands in fixed reception intervals and reception windows. In this embodiment, the reception window in which first processing unit 131 can receive the first control command is referred to as a scan window, and the reception interval between scan windows is referred to as a scan interval. The same applies to second processing unit 132. In this embodiment, the scan window of first processing unit 131 and the scan window of second processing unit 132 are temporally mutually exclusive. Naturally, since control commands are intermittently transmitted per scan interval, unless the scan window overlaps with the transmission period of the control command, communications device 30 cannot receive control commands. Accordingly, in this embodiment, ZigBee communication between one or more first lighting devices 11 and communications device 30 and Bluetooth (registered trademark) communication between one or more second lighting devices 21 and communications device 30 are temporally mutually exclusive and performed alternately. Note that where the terminology "control command" is used herein, it is used to collectively refer to both the first and second control commands.

Third communications unit 34 is connected to RF unit 33. Third communications unit 34 includes a wireless communications antenna that transmits and receives control commands to and from one or more first lighting devices 11 and one or more second lighting devices 21.

Upon receipt of a control command from first processing unit 131 or second processing unit 132, RF unit 33, for example, filters and amplifies the control command, and outputs it to third communications unit 34. RF unit 33 filters the first control command received from the one or more first lighting devices 11 via third communications unit 34, outputs the result to first processing unit 131, filters the second control command received from the one or more second lighting devices 21 via third communications unit 34, and outputs the result to second processing unit 132.

RF unit 33 includes a transmission circuit and a reception circuit. The transmission circuit includes, for example, for control commands it is to transmit, a transmission filter that extracts a transmission band signal indicated in the control command, a transmission mixer that up-converts a signal output from the transmission filter into a high frequency signal, and a preamplifier that amplifies the up-converted high frequency signal. The reception circuit includes, for example, a reception mixer that converts a high frequency signal received by third communications unit 34 from the one or more first lighting devices 11 and the one or more second lighting devices 21, into a low frequency signal.

(Operations)

Next, operations performed by lighting system 1 will be described.

Figure 3:
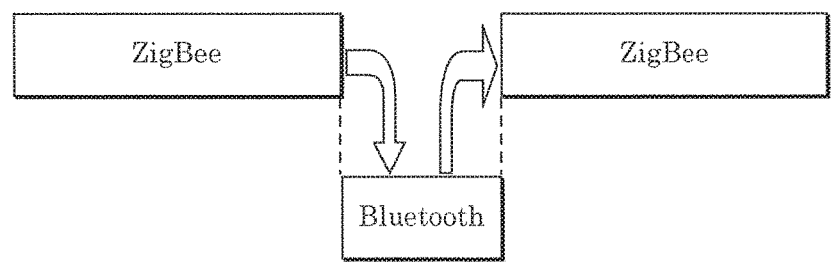
FIG. 3 illustrates operations performed by a communications device in a lighting system according to Embodiment 1.
Figure 4:
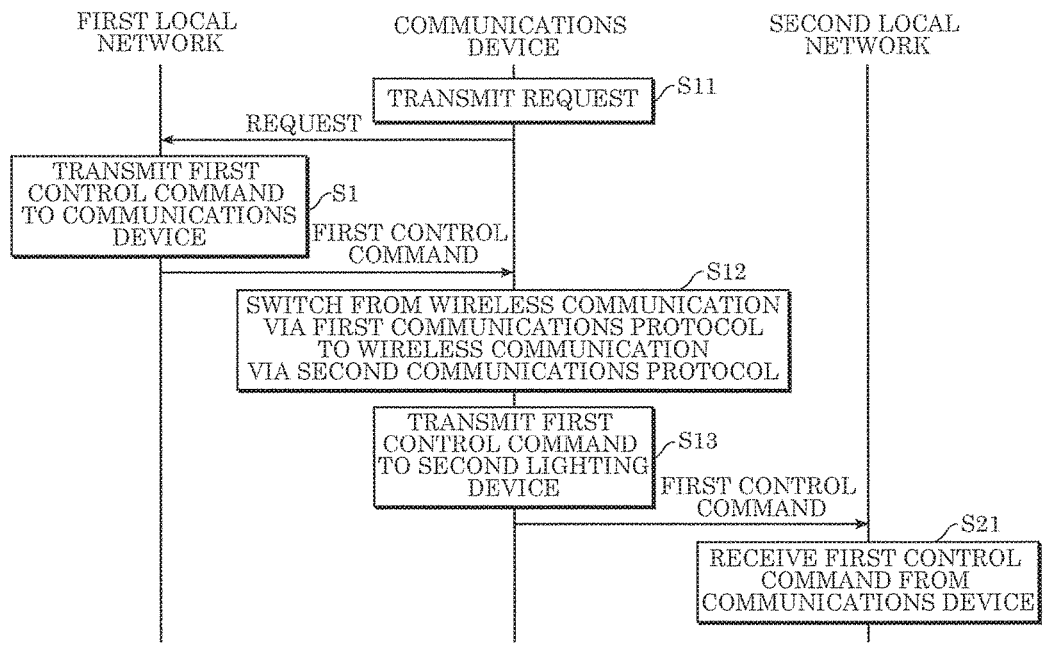
FIG. 4 is a sequence chart illustrating operations performed by a lighting system according to Embodiment 1.

FIG. 3 illustrates operations performed by communications device 30 in lighting system 1 according to Embodiment 1. FIG. 4 is a sequence chart illustrating operations performed by lighting system 1 according to Embodiment 1.

Here, an example will be given in which a first control command is transmitted from one or more first lighting devices 11 included in first local network 10 to one or more second lighting devices 21 included in second local network 20 as a result of a user operating a control terminal, as illustrated in FIG. 4.

First, communications device 30 transmits a request to one or more first lighting devices 11 included in first local network 10 to obtain the first control command indicating a lighting scene set by the user and to be reproduced by one or more first lighting devices 11 (S11). More specifically, control unit 31 transmits a request to one or more first lighting devices 11 via third communications unit 34.

Next, as illustrated in FIG. 3 and FIG. 4, when one or more first lighting devices 11 receive, via first communications unit 114, the request transmitted by communications device 30, the one or more first lighting devices 11 transmit the first control command to communications device 30 (S1).

Next, communications device 30 receives the first control command. Control unit 31 in communications device 30 switches from performing wireless communication via the first communications protocol to performing wireless communication via the second communications protocol (S12). In other words, control unit 31 causes second processing unit 132 to transmit, via Bluetooth (registered trademark), to one or more second lighting devices 21 included in second local network 20, the first control command obtained by first processing unit 131 via ZigBee communication between one or more first lighting devices 11 and communications device 30. Note that here, when communications device 30 includes a lamp, communications device 30 may store the received first control command into a storage unit such as memory, and the lamp may emit light according to the lighting scene indicated in the first control command.

Next, control unit 31 causes second processing unit 132 to transmit, via the second communications protocol, the first control command received from one or more first lighting devices 11 via third communications unit 34, to one or more second lighting devices 21 included in second local network 20 (S13). In other words, second processing unit 132 transmits, via third communications unit 34, the first control command to one or more second lighting devices 21 using the second communications protocol.

Next, one or more second lighting devices 21 receive the first control command from communications device 30 via second communications unit 124 (S21). This completes the processing.

Next, an example will be given in which a second control command is transmitted to one or more first lighting devices 11 included in first local network 10 from one or more second lighting devices 21 included in second local network 20.

Figure 5:
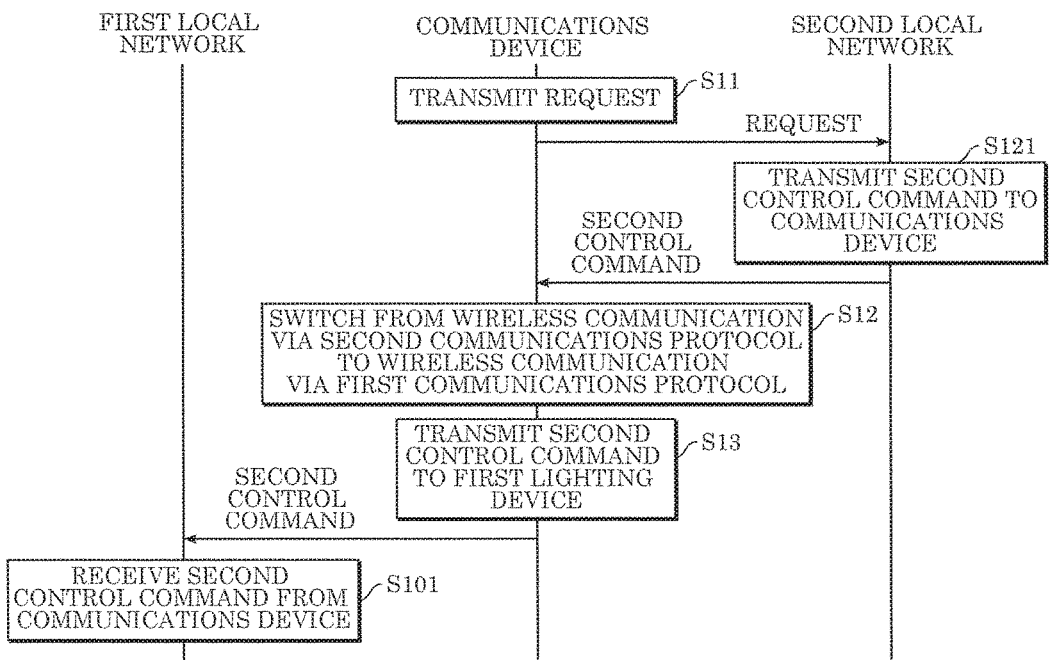
FIG. 5 is a sequence chart illustrating operations performed by a lighting system according to Embodiment 1.

FIG. 5 is a sequence chart illustrating operations performed by lighting system 1 according to Embodiment 1.

First, as illustrated in FIG. 5, communications device 30 transmits a request to one or more second lighting devices 21 included in second local network 20 to obtain the second control command indicating a lighting scene set by the user and to be reproduced by one or more second lighting devices 21 (S11).

Next, when one or more second lighting devices 21 receive, via second communications unit 124, the request transmitted by communications device 30, the one or more second lighting devices 21 transmit the second control command to communications device 30 (S121).

Next, communications device 30 receives the second control command. Control unit 31 in communications device 30 then switches from performing wireless communication via the second communications protocol to performing wireless communication via the first communications protocol (S12). In other words, control unit 31 causes first processing unit 131 to transmit, via ZigBee, to one or more first lighting devices 11 included in first local network 10, the second control command obtained by second processing unit 132 via Bluetooth (registered trademark) communication between one or more second lighting devices 21 and communications device 30. Note that here, when communications device 30 includes a lamp, communications device 30 may store the received second control command into a storage unit such as memory, and the lamp may emit light according to the lighting scene indicated in the second control command.

Next, control unit 31 causes first processing unit 131 to transmit, via the first communications protocol, the second control command received from one or more second lighting devices 21 via third communications unit 34, to one or more first lighting devices 11 included in first local network 10 (S13). In other words, first processing unit 131 transmits, via third communications unit 34, the second control command to one or more first lighting devices 11 using the first communications protocol.

Next, one or more first lighting devices 11 receive the second control command from communications device 30 via first communications unit 114 (S101). This completes the processing.

With this, as illustrated in FIG. 4 and FIG. 5, in lighting system 1, first local network 10 and second local network 20, which are mutually different, can wirelessly communicate.

(Operational Advantages)

Next, the operational advantages of communications device 30 according to this embodiment will be described.

As described above, communications device 30 according to this embodiment connects one or more first lighting devices 11 included in first local network 10 with one or more second lighting devices 21 included in second local network 20 different from first local network 10. Communications device 30 includes a single semiconductor integrated circuit 32 including: first processing unit 131 configured to wirelessly communicate with the one or more first lighting devices 11 via a first communications protocol; second processing unit 132 configured to wirelessly communicate with the one or more second lighting devices 21 via a second communications protocol different from the first communications protocol; and control unit 31 configured to switch between causing first processing unit 131 to wirelessly communicate with the one or more first lighting devices 11 and causing second processing unit 132 to wirelessly communicate with the one or more second lighting devices 21. Control unit 31 is further configured to: when first processing unit 131 receives a first control command from the one or more first lighting devices 11, cause second processing unit 132 to transmit the first control command to the one or more second lighting devices 21 via the second communications protocol; and when second processing unit 132 receives a second control command from the one or more second lighting devices 21, cause first processing unit 131 to transmit the second control command to the one or more first lighting devices 11 via the first communications protocol.

With this, control unit 31 switches between causing first processing unit 131 to wirelessly communicate with the one or more first lighting devices 11 and causing second processing unit 132 to wirelessly communicate with the one or more second lighting devices 21. When first processing unit 131 receives a first control command from one or more first lighting devices 11 via the first communications protocol, control unit 31 can cause second processing unit 132 to transmit the first control command to one or more second lighting devices 21 via the second communications protocol. When second processing unit 132 receives a second control command from one or more second lighting devices 21 via the second communications protocol, control unit 31 can cause first processing unit 131 to transmit the second control command to one or more first lighting devices 11 via the first communications protocol. This makes it possible to connect first local network 10 and second local network 20 that use different communications protocols.

This communications device 30 communicably connects first local network 10 and second local network 20 without using the internet or a cloud server. Accordingly, compared to transmitting and receiving control commands between first local network 10 and second local network 20 using the internet or a cloud server, the configuration according to the present embodiment achieves faster communication speeds between first local network 10 and second local network 20.

Accordingly, with this communications device 30, it is possible to increase communication speeds between two different local networks without using the internet.

Moreover, in communications device 30 according to this embodiment, control unit 31 is configured to perform wireless communication using first processing unit 131 and perform wireless communication using second processing unit 132 temporally mutually exclusively.

In this way, control unit 31 does not cause second processing unit 132 to wirelessly communicate with one or more second lighting devices 21 while first processing unit 131 is wirelessly communicating with one or more first lighting devices 11, and does not cause first processing unit 131 to wirelessly communicate with one or more first lighting devices 11 while second processing unit 132 is wirelessly communicating with one or more second lighting devices 21. Stated differently, control unit 31 does not allow wireless communication between first processing unit 131 and one or more first lighting devices 11 to occur concurrently with wireless communication between second processing unit 132 and one or more second lighting devices 21. This eliminates the need for two or more semiconductor integrated circuits 32 required in order to achieve concurrent wireless communication, which inhibits an increase in the size of communications device 30 and inhibits rising costs.

Moreover, in communications device 30 according to this embodiment, first processing unit 131 and second processing unit 132 use a communications protocol that does not include an IP stack.

Examples of communications protocols that do not include an IP stack include Bluetooth (registered trademark) and ZigBee. Even when different communications protocols are used as the first communications protocol and second communications protocol, it is possible to perform wireless communication between first local network 10 and second local network 20.

Moreover, in communications device 30 according to this embodiment, the first communications protocol has a scan window and the second communications protocol has a scan window that partially temporally overlap.

Moreover, in communications device 30 according to this embodiment, the first communications protocol is ZigBee, and the second communications protocol is Bluetooth.

Moreover, in communications device 30 according to this embodiment, the first information includes a first control command that controls operation of the one or more first lighting devices 11, and the second information includes a second control command that controls operation of the one or more second lighting devices 21.

As described above, communications device 30 according to this embodiment connects one or more first lighting devices 11 included in first mesh network 10 with one or more second lighting devices 21 included in second mesh network 20 different from first mesh network 10. Communications device 30 includes a single semiconductor integrated circuit 32 including: first processing unit 131 configured to wirelessly communicate with the one or more first lighting devices 11 via a first communications protocol; second processing unit 132 configured to wirelessly communicate with the one or more second lighting devices 21 via a second communications protocol different from the first communications protocol; and control unit 31 configured to switch between causing first processing unit 131 to wirelessly communicate with the one or more first lighting devices 11 and causing second processing unit 132 to wirelessly communicate with the one or more second lighting devices 21. Control unit 31 is further configured to: when first processing unit 131 receives a first control command from the one or more first lighting devices 11, cause second processing unit 132 to transmit the first control command to the one or more second lighting devices 21 via the second communications protocol; and when second processing unit 132 receives a second control command from the one or more second lighting devices 21, cause first processing unit 131 to transmit the second control command to the one or more first lighting devices 11 via the first communications protocol Moreover, the communications system according to this embodiment includes communications device 30, one or more first lighting devices 11, and one or more second lighting devices 21.

Moreover, lighting system 1 according to this embodiment includes communications device 30, one or more first devices each of which is first lighting device 11, and one or more second devices each of which is second lighting device 21.

Embodiment 2

(Configuration)

Next, the configuration of lighting system 1 according to this embodiment will be described.

Figure 6:
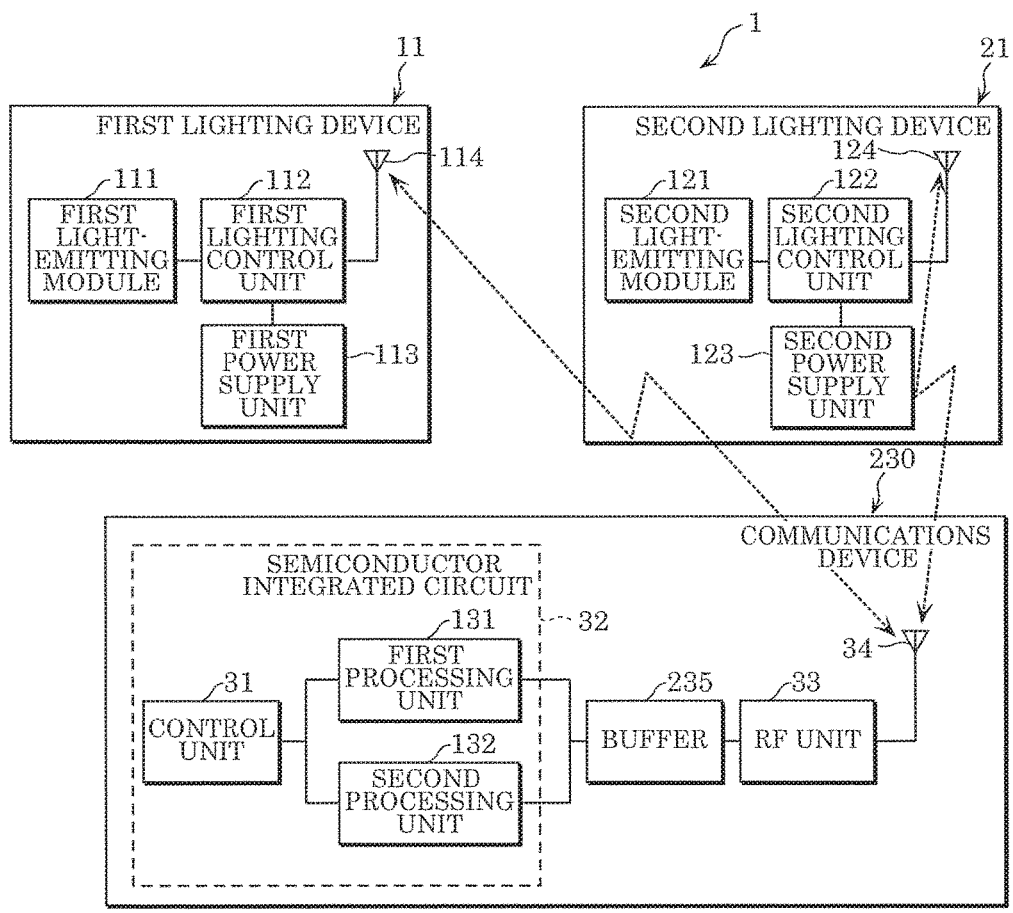
FIG. 6 is a block diagram of a lighting system according to Embodiment 2.
Figure 7:
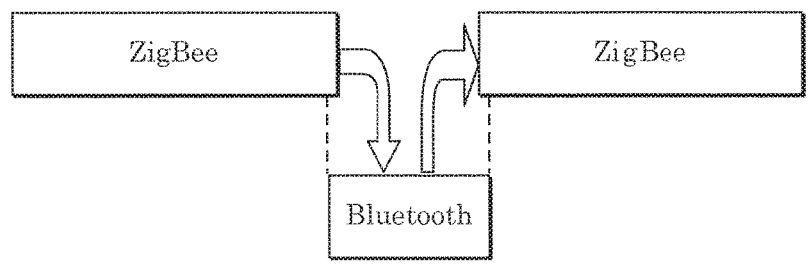
FIG. 7 illustrates operations performed by a communications device in a lighting system according to Embodiment 2.

FIG. 6 is a block diagram of lighting system 1 according to Embodiment 2. FIG. 7 illustrates operations performed by communications device 230 of lighting system 1 according to Embodiment 2.

As illustrated in FIG. 7, in this embodiment, the scan windows for Bluetooth (registered trademark) and ZigBee overlap, unlike in Embodiment 1 in which the scan windows for Bluetooth (registered trademark) and ZigBee are temporally mutually exclusive. Unless stated otherwise, the configuration of communications device 230 according to this embodiment is the same as described in Embodiment 1. Moreover, like elements share like reference signs in the drawings, and repeated detailed description of like elements will be omitted.

As illustrated in FIG. 6, communications device 230 includes buffer 235 in addition to control unit 31, third communications unit 34, and RF unit 33.

Buffer 235 is connected between (i) first processing unit 131 and second processing unit 132 and (ii) RF unit 33. Buffer 235 temporarily stores a control command received from one or more first lighting devices 11 and one or more second lighting devices 21, until it is to be transferred to one or more second lighting devices 21 and one or more first lighting devices 11. Buffer 235 assists in controlling loss of information so as to receive the control command with certainty. Buffer 235 is one example of the storage.

When the scan windows for Bluetooth (registered trademark) and ZigBee overlap, for example, when switching between causing first processing unit 131 to communicate with one or more first lighting devices 11 and causing second processing unit 132 to communicate with one or more second lighting devices 21, there is a time interval for the switching. During this time interval, since the received control command is stored in buffer 235, it is not a problem if there is a partial temporal overlap of Bluetooth (registered trademark) communication and ZigBee communication.

Control unit 31 stores the first control command received by first processing unit 131 using the first communications protocol into buffer 235, and when control unit 31 causes second processing unit 132 to transmit the first control command to one or more second lighting devices 21 using the second communications protocol, control unit 31 deletes the first control command from buffer 235. Control unit 31 stores the second control command received by second processing unit 132 using the second communications protocol into buffer 235, and when control unit 31 causes first processing unit 131 to transmit the second control command to one or more first lighting devices 11 using the first communications protocol, control unit 31 deletes the second control command from buffer 235.

Note that since buffer 235 includes a queue function, when control unit 31 causes first processing unit 131 to transmit the second control command to one or more first lighting devices 11 using the first communications protocol and when control unit 31 causes second processing unit 132 to transmit the first control command to one or more second lighting devices 21 using the second communications protocol, "backoff" control is performed such that the mesh signal that returns after transmission is not retransmitted. Accordingly, control unit 31 deletes the transmitted control command after a predetermined period has elapsed from the end of the transmission. In other words, control unit 31 does not delete the control command immediately after the end of transmission. The predetermined period is, for example, when the queue buffer size is 16, the period it takes for 16 different messages to be transmitted.

(Operations)

Next, operations performed by lighting system 1 will be described.

FIG. 8 is a sequence chart illustrating operations performed by lighting system 1 according to Embodiment 2.

Note that repeated description of processes that are the same as described in Embodiment 1 is omitted as appropriate.

First, as illustrated in FIG. 8, communications device 230 transmits a request to one or more first lighting devices 11 included in first local network 10 to obtain the first control command indicating a lighting scene set by the user and to be reproduced by one or more first lighting devices 11 (S11).

Next, as illustrated in FIG. 7 and FIG. 8, when one or more first lighting devices 11 receive, via first communications unit 114, the request transmitted by communications device 230, the one or more first lighting devices 11 transmit the first control command to communications device 230 (S1). Alternatively, sniffing is performed to monitor control commands transmitted by communications device 230 for signals transmitted from the first local network. Sniffing may be regularly implemented at a predetermined timing, like pinging, and may be implemented when communications device 230 switches protocols.

Next, in communications device 230, third communications unit 34 receives the first control command, and the first control command is stored in buffer 235 via RF unit 33 (S211).

Next, control unit 31 in communications device 230 switches from performing wireless communication via the first communications protocol to performing wireless communication via the second communications protocol (S12).

Next, control unit 31 causes second processing unit 132 to transmit, via the second communications protocol, the first control command received from one or more first lighting devices 11 via third communications unit 34, to one or more second lighting devices 21 included in second local network 20 (S13). Control unit 31 causes second processing unit 132 to transmit the first control command to one or more second lighting devices 21 via the second communications protocol, and deletes the first control command from buffer 235 after elapse of a predetermined period from the end of the transmission.

The destination address of the control command (S1) in this case may be specified as a reception target address for second local network 20 when addressing is possible, and when addressing is not possible (i.e., when address format is completely different), an address of second local network 20 stored in communications device 230 may be specified, the address of second local network 20 may be stored in a transport message, may be retrieved by communications device 230 and overwrite the destination address with it when switching is performed.

Next, one or more second lighting devices 21 receive the first control command from communications device 230 via second communications unit 124 (S21). This completes the processing.

Next, an example will be given in which a second control command is transmitted to one or more first lighting devices 11 included in first local network 10 from one or more second lighting devices 21 included in second local network 20.

FIG. 9 is a sequence chart illustrating operations performed by lighting system 1 according to Embodiment 2.

First, as illustrated in FIG. 9, communications device 230 transmits a request to one or more second lighting devices 21 included in second local network 20 to obtain the second control command indicating a lighting scene set by the user and to be reproduced by one or more second lighting devices 21 (S11).

Next, when one or more second lighting devices 21 receive, via second communications unit 124, the request transmitted by communications device 230, the one or more second lighting devices 21 transmit the second control command to communications device 230 (S121).

Next, communications device 230 receives the second control command. In communications device 230, the second control command is stored in buffer 235 via RF unit 33 (S211).

Next, control unit 31 in communications device 230 switches from performing wireless communication via the second communications protocol to performing wireless communication via the first communications protocol (S12).

Next, control unit 31 causes first processing unit 131 to transmit, via the first communications protocol, the second control command received from one or more second lighting devices 21 via third communications unit 34, to one or more first lighting devices 11 included in first local network 10 (S13). Control unit 31 causes first processing unit 131 to transmit the second control command to one or more first lighting devices 11 via the first communications protocol, and deletes the second control command from buffer 235 after elapse of a predetermined period from the end of the transmission.

Next, one or more first lighting devices 11 receive the second control command from communications device 230 via first communications unit 114 (S101). This completes the processing.

With this, as illustrated in FIG. 8 and FIG. 9, in lighting system 1, first local network 10 and second local network 20, which are mutually different, can wirelessly communicate.

(Operational Advantages)

Next, the operational advantages of communications device 230 according to this embodiment will be described.

As described above, communications device 230 according to this embodiment further includes buffer 235. Control unit 31 is further configured to: store the first control command received by first processing unit 131 via the first communications protocol in buffer 235 and delete the first control command from buffer 235 if causing second processing unit 132 to transmit the first control command to the one or more second lighting devices 21 via the second communications protocol; and store the second control command received by second processing unit 132 via the second communications protocol in buffer 235 and delete the second control command from buffer 235 if causing first processing unit 131 to transmit the second control command to the one or more first lighting devices 11 via the first communications protocol.

With this, while first processing unit 131 is receiving a first control command from one or more first lighting devices 11, control unit 31 stores the first control command in buffer 235. Additionally, while second processing unit 132 is receiving a second control command from one or more second lighting devices 21, control unit 31 stores the second control command in buffer 235. Accordingly, communications device 230 can prevent loss of control commands received from one or more first lighting devices 11 and one or more second lighting devices 21. Moreover, when transmitting the first control command to one or more second lighting devices 21 and transmitting the second control command to one or more first lighting devices 11, since the appropriate control command is deleted, buffer 235 will not be flooded with control commands. This allows for the stable communication of information between first local network 10 and second local network 20.

The same operational advantages achieved with Embodiment 1 are also achievable with this embodiment.

(Other Variations, etc.)

Hereinbefore, the present disclosure has been described based on embodiments, but the present disclosure is not limited to the communications device described above.

For example, in the communications device according to each of the above embodiments, the control unit is exemplified as, but not limited to, being connected to the first processing unit and the second processing unit in the semiconductor integrated circuit in FIG. 2 and FIG. 6; the control unit may be connected to the RF unit. In such cases, it is possible to obtain control commands from the RF unit.

Moreover, each component included in the communications device according to the above embodiments are generally realized as an LSI circuit, which is an integrated circuit. Each of these components may be individually realized as a single chip, or a portion or all of the processing units may be realized as a single chip.

Moreover, circuit integration is not limited to LSI, the processing units may be realized as a dedicated circuit or generic processor. A field programmable gate array (FPGA) that is programmable after manufacturing of the LSI circuit, or a reconfigurable processor whose connections and settings regarding circuit cells in the LSI circuit are reconfigurable, may be used.

One or more of the elements in the above embodiments may be configured from dedicated hardware, or may be realized by executing a software program suitable for the element. One or more of the elements may be realized by means of a program executing unit, such as a CPU and a processor, reading and executing the software program recorded on a recording medium such as a hard disk or a semiconductor memory.

Moreover, all of the values used above are mere examples presented for illustratively describing the present disclosure in detail; the embodiments of the present disclosure are not limited to the exemplary values.

Moreover, the block diagrams illustrate one example of the division of functional blocks; a plurality of functional blocks may be realized as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

Moreover, the sequence in which the steps are executed in the flow charts are mere examples presented for illustratively describing the present disclosure in detail; the steps may be executing in a different order. Moreover, some of the steps may be executed at the same time as (in parallel with) other steps.

Embodiments arrived at by a person skilled in the art making various modifications to any one of the above embodiments as well as embodiments realized by arbitrarily combining structural components and functions in Embodiments 1 and 2 which do not depart from the essence of the present disclosure are included in the present disclosure.

What is claimed is:

1. A communications device that connects one or more first devices included in a first local network with one or more second devices included in a second local network different from the first local network, the communications device comprising:
    a single semiconductor integrated circuit including:
        a first processor configured to wirelessly communicate with the one or more first devices via a first communications protocol;
        a second processor configured to wirelessly communicate with the one or more second devices via a second communications protocol different from the first communications protocol; and
        a controller configured to switch between causing the first processor to wirelessly communicate with the one or more first devices and causing the second processor to wirelessly communicate with the one or more second devices,
    wherein the controller is further configured to:
        when the first processor receives first information from the one or more first devices, cause the second processor to transmit the first information to the one or more second devices via the second communications protocol; and
        when the second processor receives second information from the one or more second devices, cause the first processor to transmit the second information to the one or more first devices via the first communications protocol.

2. The communications device according to claim 1, wherein
    the controller is configured to perform wireless communication using the first processor and perform wireless communication using the second processor temporally mutually exclusively.

3. The communications device according to claim 1, further comprising:
    storage,
    wherein the controller is further configured to:
        store the first information received by the first processor via the first communications protocol in the storage and delete the first information from the storage if causing the second processor to transmit the first information to the one or more second devices via the second communications protocol; and
        store the second information received by the second processor via the second communications protocol in the storage and delete the second information from the storage if causing the first processor to transmit the second information to the one or more first devices via the first communications protocol.

4. The communications device according to claim 1, wherein
    the first processor and the second processor are each configured to use a communications protocol that does not include an IP stack.

5. The communications device according to claim 1, wherein
    the first communications protocol has a scan window and the second communications protocol has a scan window that partially temporally overlap.

6. The communications device according to claim 1, wherein
    the first communications protocol is ZigBee, and
    the second communications protocol is Bluetooth.

7. The communications device according to claim 1, wherein
  each of the one or more first devices is a first lighting device,
  each of the one or more second devices is a second lighting device,
  the first information includes a first control command that controls operation of the one or more first devices, and
  the second information includes a second control command that controls operation of the one or more second devices.

8. A communications device that connects one or more first devices included in a first mesh network with one or more second devices included in a second mesh network different from the first mesh network, the communications device comprising:
  a single semiconductor integrated circuit including:
    a first processor configured to wirelessly communicate with the one or more first devices via a first communications protocol;
    a second processor configured to wirelessly communicate with the one or more second devices via a second communications protocol different from the first communications protocol; and
    a controller configured to switch between causing the first processor to wirelessly communicate with the one or more first devices and causing the second processor to wirelessly communicate with the one or more second devices,
  wherein the controller is further configured to:
    when the first processor receives first information from the one or more first devices, cause the second processor to transmit the first information to the one or more second devices via the second communications protocol; and
    when the second processor receives second information from the one or more second devices, cause the first processor to transmit the second information to the one or more first devices via the first communications protocol.

9. A lighting system, comprising:
  the communications device according to claim 1;
  the one or more first devices, wherein each of the one or more first devices is a first lighting device; and
  the one or more second devices, wherein each of the one or more second devices is a second lighting device.

* * * * *